March 5, 1963 D. L. TURNER 3,079,711
ONE-WAY ANIMAL GATE
Filed Dec. 22, 1960
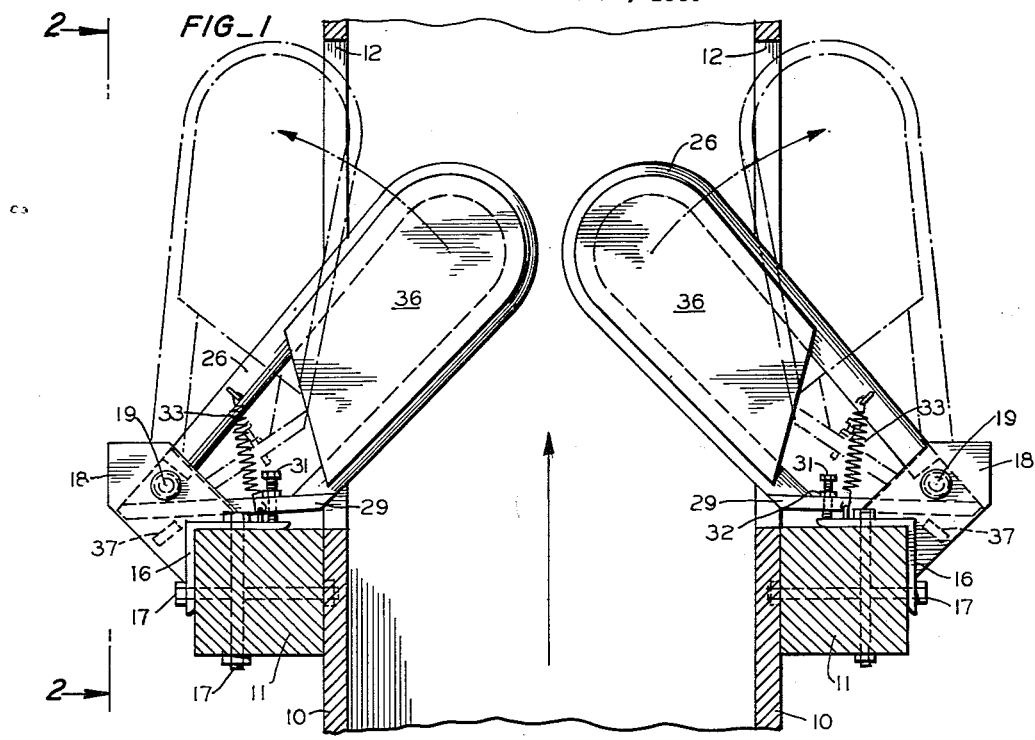
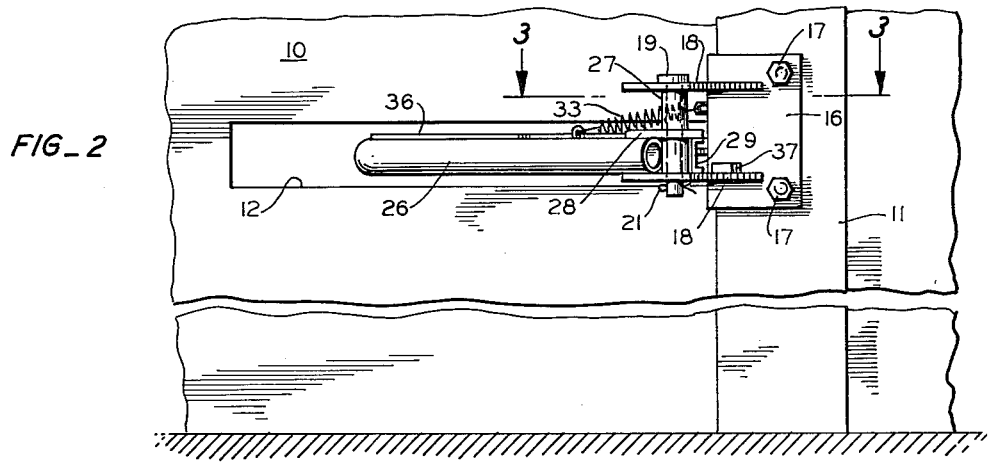
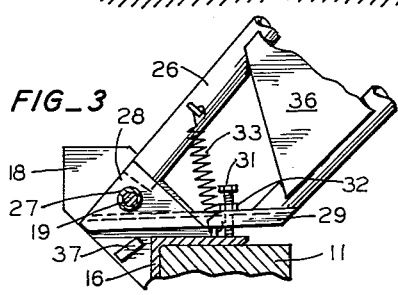
INVENTOR.
DEAN L. TURNER
BY
*Allen and Chromy*
ATTORNEYS United States Patent Office 3,079,711
Patented Mar. 5, 1963

3,079,711
ONE-WAY ANIMAL GATE
Dean L. Turner, Modesto, Calif.
(765 Coleman St., San Jose 10, Calif.)
Filed Dec. 22, 1960, Ser. No. 77,616
3 Claims. (Cl. 39—87)

The present invention relates to gate structures for preventing movement of animals such as cattle in an undesired direction through a passageway, gate or chute, and is concerned more particularly with a gate structure of the above character which will be economical to build, which will be positive and safe in its operation, and which will be unlikely to get out of order.

It is a general object of the invention to provide an improved one-way gate structure for controlling the passage of animals through an opening or passageway such as an animal chute.

It is another object of the invention to provide a one-way gate structure which is of simple construction, economical to manufacture, easy to install, and which is reliable and safe in its operation.

The above and other objects of the invention are attained as described in the following specification, taken in conjunction with the accompanying drawings, in which:

FIG. 1 is a fragmentary plan view of an animal chute showing the one-way gate structure in operative position;

FIG. 2 is a fragmentary side elevational view, taken as indicated by the line 2—2 in FIG. 1; and FIG. 3 is a fragmentary horizontal sectional view taken as indicated by the line 3—3 in FIG. 2.

In the handling of animals such as cattle in chutes and the like during spraying or other treatment, and also in connection with passage of animals from one field to another, it is desirable to provide a one-way gate structure at a desired height with reference to the animal to prevent backing up, which gate structure should also provide a clear view at the center for the animal so that it can see and walk through the gate rather than trying to jump over it. Preferably, the two opposite portions of the gate should move apart in the desired direction of travel, but when the animal tries to return, to resist such movement.

The invention is disclosed in connection with an animal chute having two vertical sides or walls 10 equipped with upright posts 11, the walls 10 being provided with longitudinal slots 12 for installation of the gate for free movement to and from operative position.

The two opposite portions of the gate as seen in FIG. 1 are formed as similar right-hand and left-hand structures respectively, and only one will be described in detail. Each gate includes an angle-shaped bracket 16 adapted to be secured to the post by respective bolts 17. The bracket 16 has secured thereto as by welding for example, a pair of projecting hinge plates 18 which are vertically spaced apart and are provided with aligned apertures to receive a hinge pin 19 secured in place by means such as a cotter key 21.

Each gate portion is formed as a plate-like structure with rounded animal-engaging surfaces for safety. Each portion includes a tube 26 which is bent U-shaped with the rounded portion at the active end of the gate and with the ends of the tube secured as by welding to a hinge structure including tubular portions 27 and a central plate 28 to which the ends of the tube are secured as by welding. Also a channel 29 provides an end surface on the gate extending transversely to the passageway and generally parallel to a surface of the angle bracket 16. The channel 29 is provided with a threaded aperture to receive a stop bolt 31 having a lock nut 32. A suitable tension spring 33 is secured between the tube 26 and the angle bracket 16 to urge the gate portion yieldably to closed position as shown in full lines in FIG. 1, where the stop bolt 31 engages the angle bracket 16.

The vertical opening formed by the curved end of the tube 26 is closed by a plate 36 which is welded to the tube 26, thereby preventing the possibility of an animal jumping and catching one of its legs in the tube 26. The lower one of the hinge plates 18 is provided with a stop lug 37 to limit the opening movement of the gate as seen for example in FIG. 1.

As seen in FIG. 1 the structure of the gate portions is such that the project into the passageway at an angle to the advancing animal with a space therebetween so as to be cammed apart by the legs or body of the animal as it advances, and then after the anamal passes through any pressure against the gates is resisted because of their one-way construction.

In use, in connection with the handling of cattle for example, it is desirable for one gate structure to be installed ahead of the working area of the chute, and one immediately adjacent the entrance end of the chute so that certain animals are always trapped in the chute and can be seen by the animals awaiting entrance to the chute and can always see the animal ahead of them in the chute. In this way movement of cattle into and through the chute is obtained as desired. At the same time backing of the cattle is prevented.

While I have shown and described a preferred embodiment of the invention, it will be apparent that the invention is capable of modification and variation from the form shown so that the scope thereof should be limited only by the scope of the claims appended hereto.

What I claim is:

1. A one-way gate structure for use in an animal chute or passage defined by means including a pair of opposite upright members, a pair of opposite gates mounted respectively on said members, each gate comprising a bracket for securing to the adjacent one of said members and providing a stop surface extending in a direction generally transversely of said passageway, each said bracket also including a pair of vertically spaced apart hinge plates, a stop element on one of said hinge plates, each gate also including a gate portion for projecting into the passageway from one of said members in position at an angle to the desired direction of travel along the passageway, each gate portion comprising a tube having a substantially U-shaped bend, means closing the bent tube at its U-shaped end, each gate also including hinge means secured to said tube and including an upright tubular portion disposed between a cooperating pair of said hinge plates, a hinge pin for connecting said upright tubular portion and said hinge plates, each said gate including a surface adapted in the closed position of the gate to be adjacent said stop surface, adjustable means defining the closed position of said gate, and spring means urging said gate to closed position, said stop element limiting the extent of opening movement of said gate, said pair of projecting gate portions having their ends spaced apart to provide a view by the animal through the passageway, and being adapted to be moved apart in one direction of movement of an animal and being adapted to resist movement apart upon urging by an animal in the opposite direction.

2. A one-way gate structure for use in an animal chute or passage defined by means including a pair of opposite upright members, a pair of opposite gates mounted respectively on said members, each gate comprising bracket means for securing to the adjacent one of said members, and a gate portion for projecting into the passageway from one of said members in position at an angle to the direction of travel along the passageway, each gate portion comprising a tube having a substantially U- shaped bend, plate means closing the bent tube at its U-shaped end, a hinge means for supporting said gate portion on said bracket means, and spring means urging said gate to closed position.

3. A one-way gate structure for use in an animal chute or passage defined by means including a pair of opposite upright members, a pair of opposite gates mounted respectively on said members, each gate comprising bracket means for securing to the adjacent one of said members and a plate-like horizontally disposed gate portion for projecting into the passageway from one of said members in position at an angle to the direction of travel along the passageway, each gate portion having rounded animal-engaging surfaces along its animal-engaging edge, hinge means for supporting said gate portion on said bracket means, and spring means urging said gate to closed position.

References Cited in the file of this patent
UNITED STATES PATENTS

| | | |
|---|---|---|
| 944,210 | Rhodes | Dec. 21, 1909 |
| 1,413,840 | Elliott | Apr. 25, 1922 |
| 2,691,231 | Cook | Oct. 21, 1954 |